United States Patent [19]

Smith

[11] 4,117,682

[45] Oct. 3, 1978

[54] SOLAR COLLECTOR SYSTEM

[76] Inventor: Otto J. M. Smith, 612 Euclid Ave., Berkeley, Calif. 94708

[21] Appl. No.: 737,489

[22] Filed: Nov. 1, 1976

[51] Int. Cl.² .............................................. F03G 7/02
[52] U.S. Cl. ...................................... 60/641; 60/670; 60/676; 60/659; 126/270; 126/271
[58] Field of Search .............. 60/659, 641, 676, 679, 60/651, 671, 670; 126/270, 271

[56] References Cited
U.S. PATENT DOCUMENTS

| 659,450 | 10/1900 | McHenry | 60/641 |
| 3,950,949 | 4/1976 | Martin et al. | 60/641 |
| 3,979,597 | 9/1976 | Drucker | 60/641 X |
| 3,991,741 | 11/1976 | Northrup et al. | 126/271 |

Primary Examiner—Allen M. Ostrager
Assistant Examiner—Stephen F. Husar
Attorney, Agent, or Firm—Flehr, Hohbach, Test, Albritton & Herbert

[57] ABSTRACT

A solar collector system uses a hexagonal field module of heliostatic mirrors with each heat receptor tower being located outside of its associated module. Each mirror includes a reflecting film held down electrostatically (for easy replacement) and protected by wind guards.

52 Claims, 10 Drawing Figures

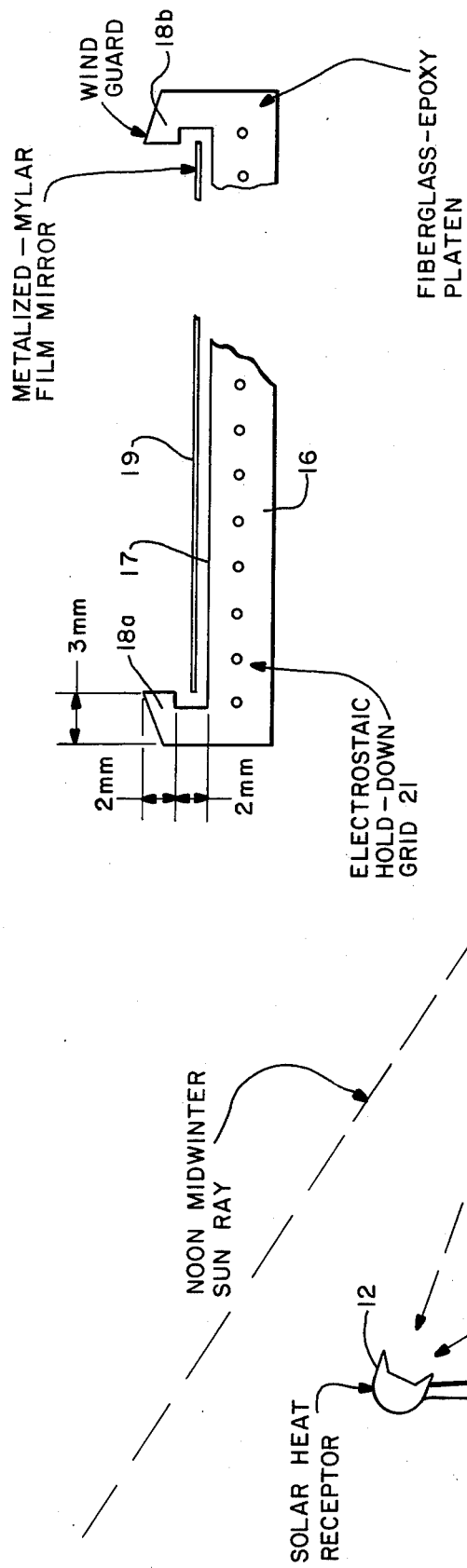
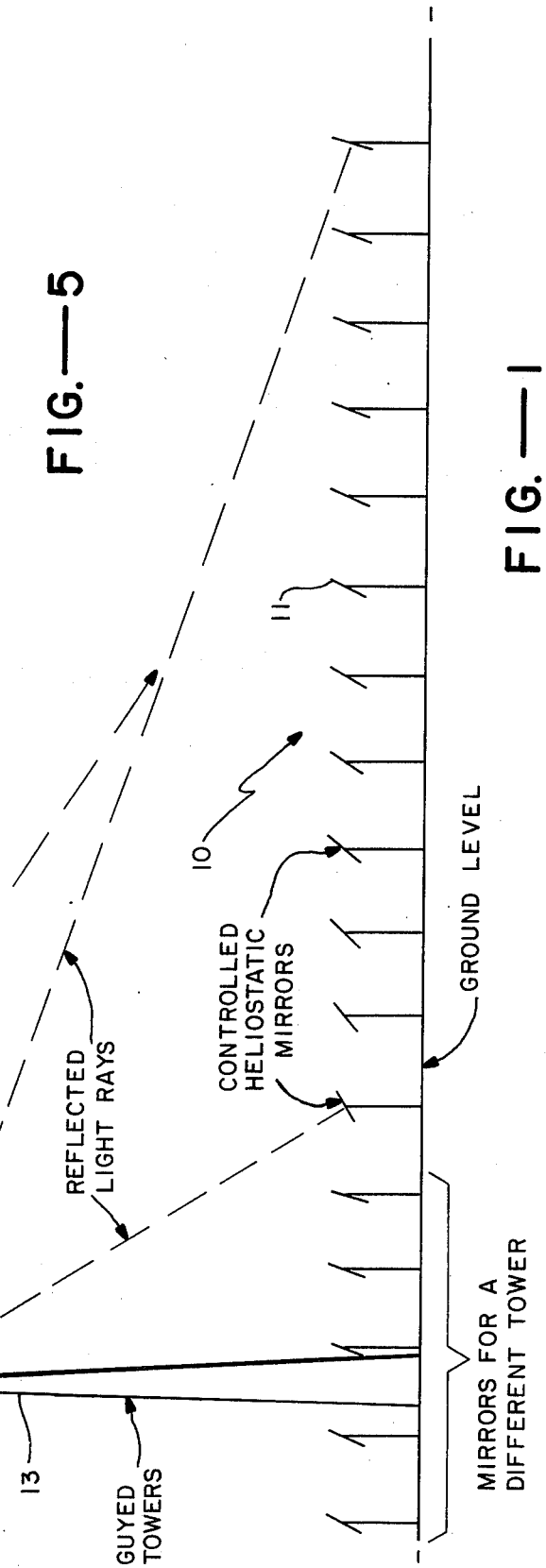

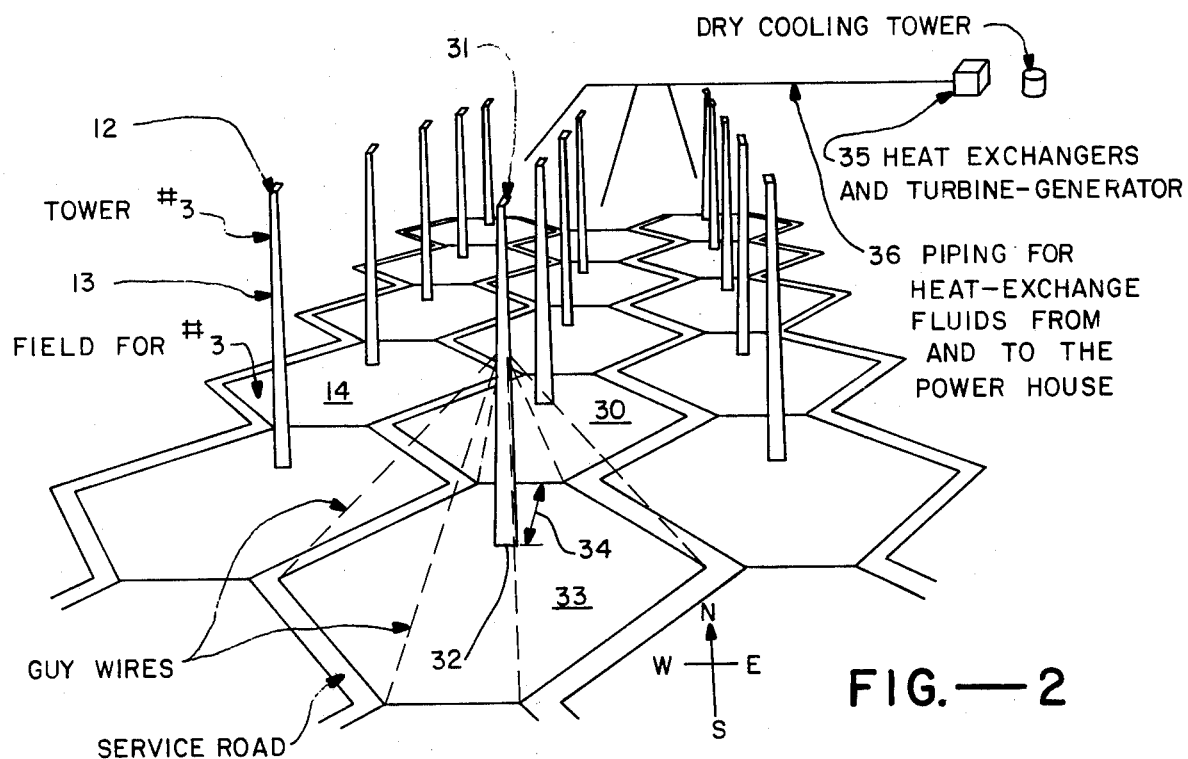
FIG.—2
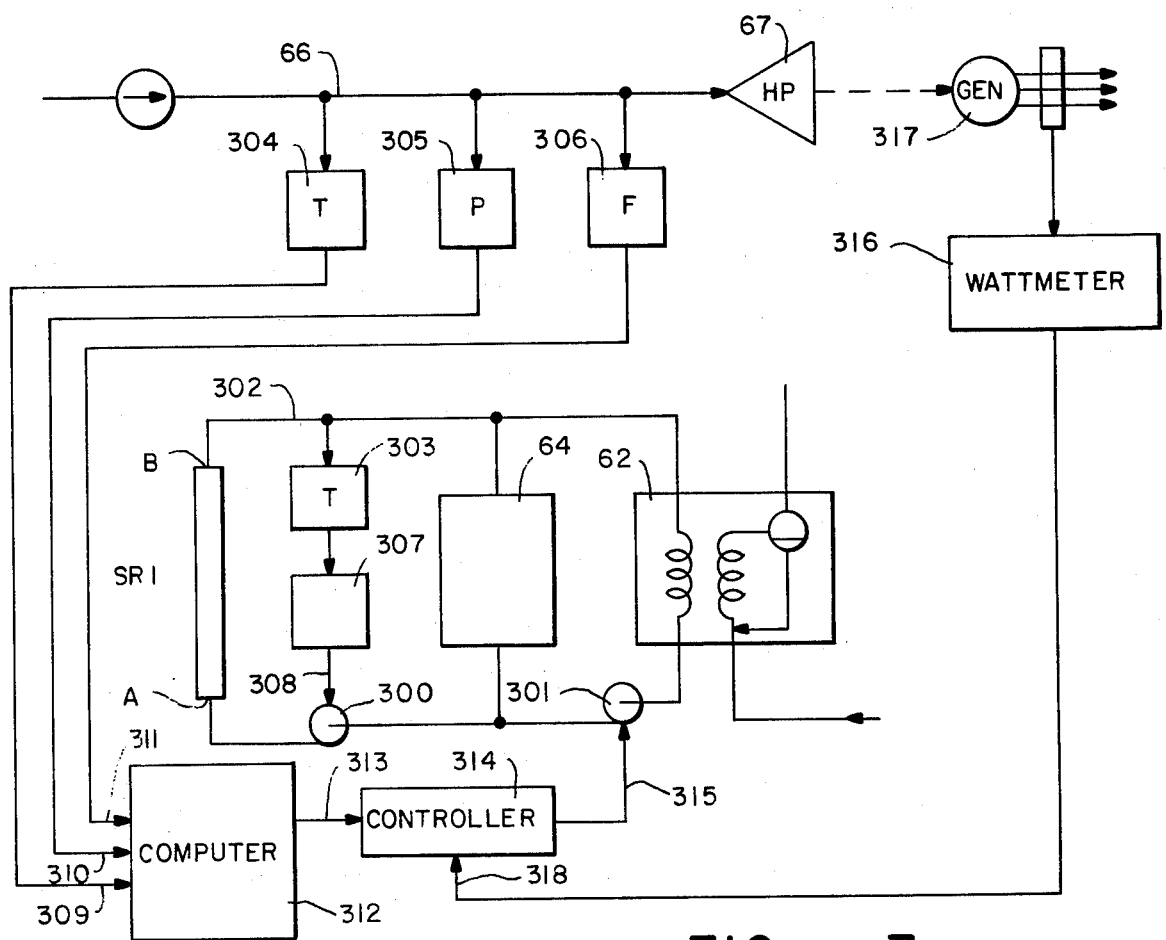
FIG.—7

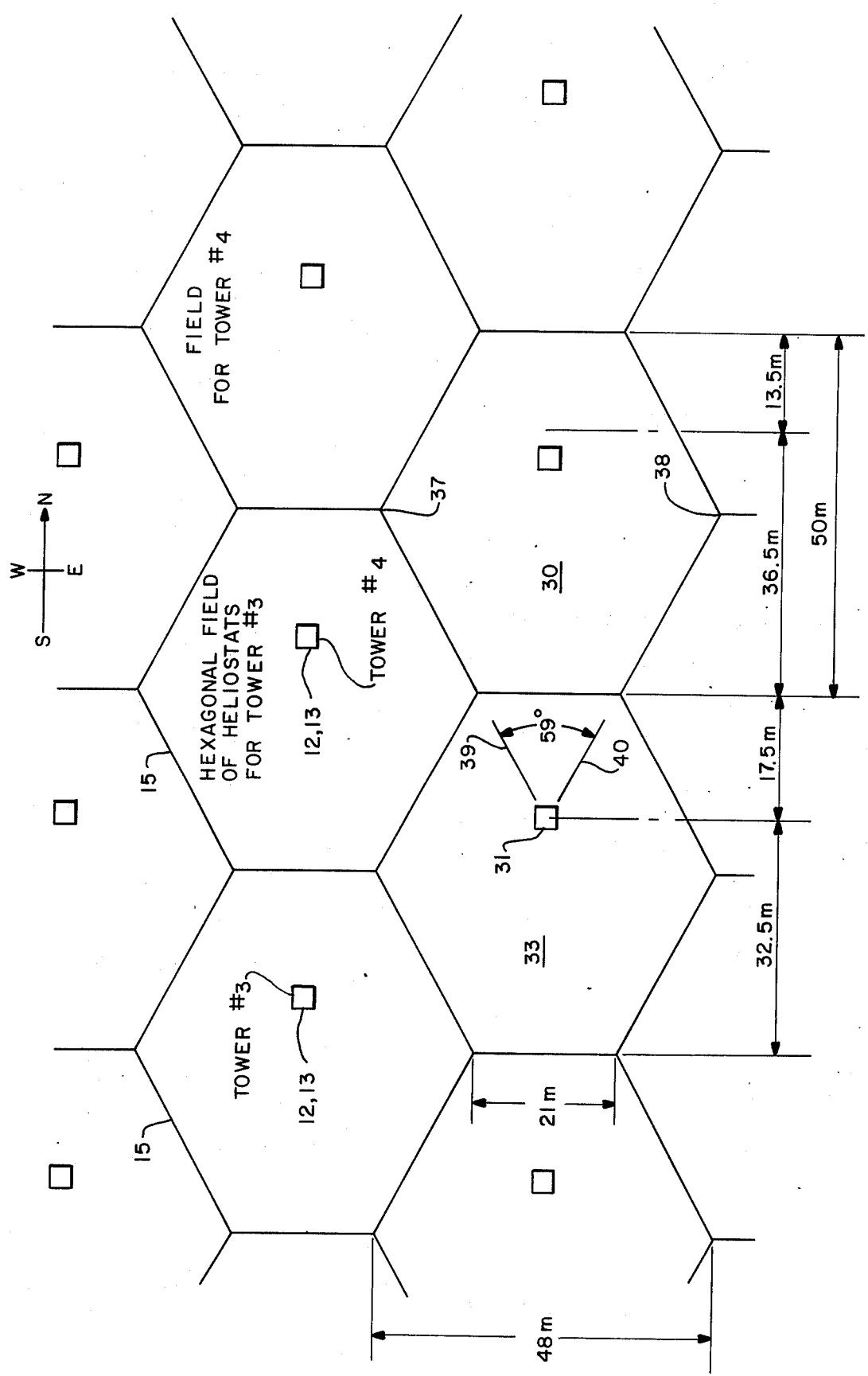
FIG.—3

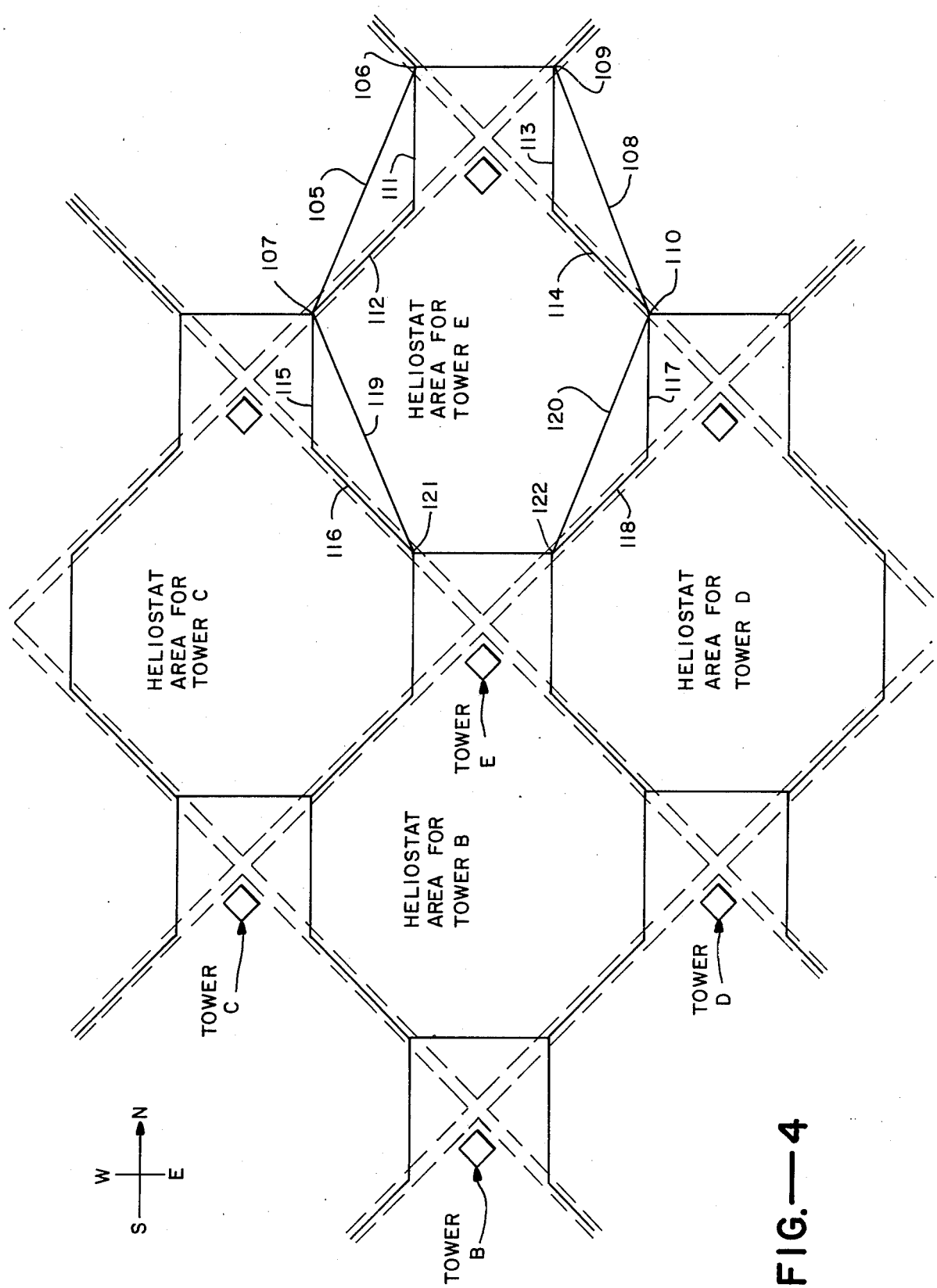
FIG.—4

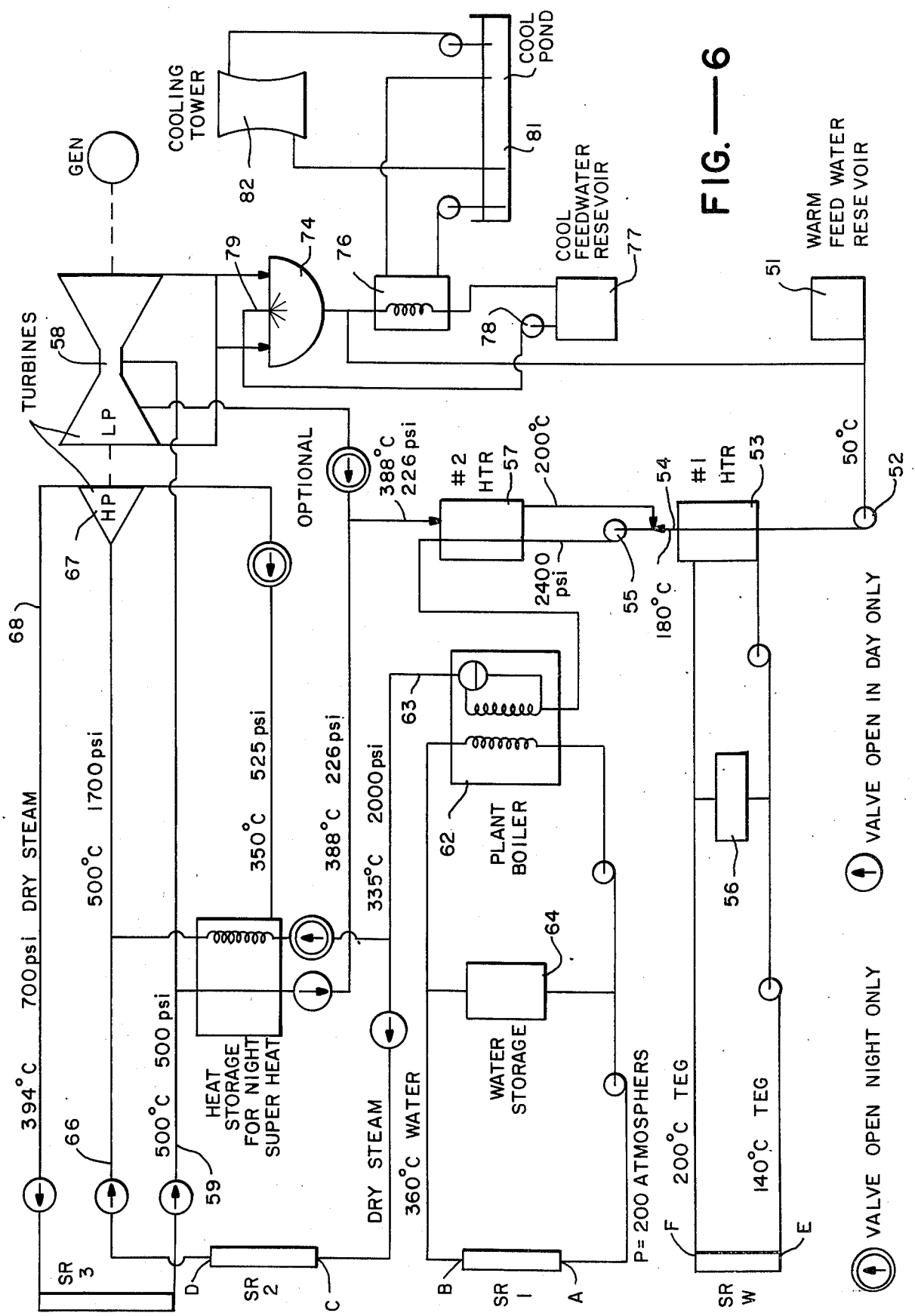

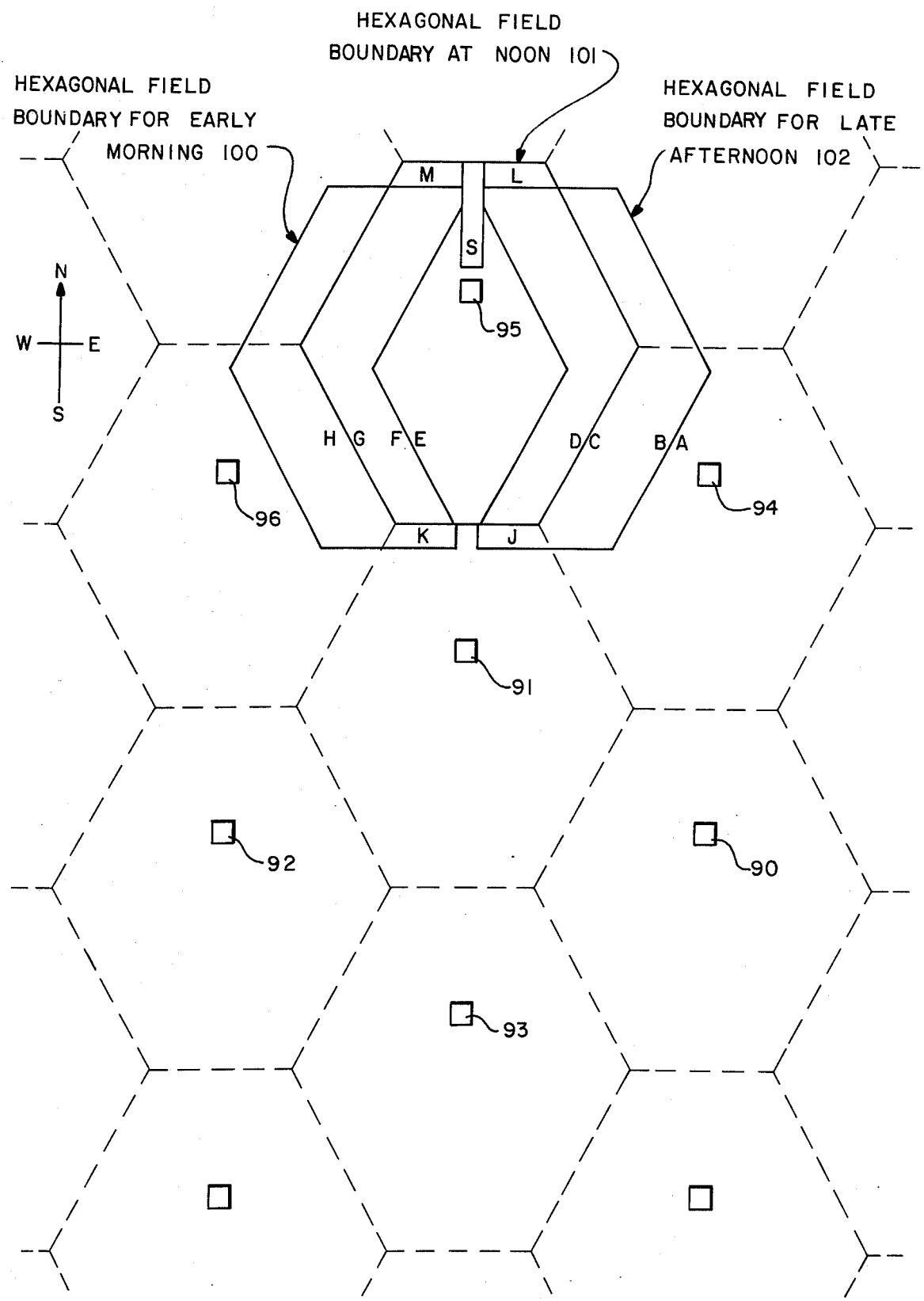
FIG.—8

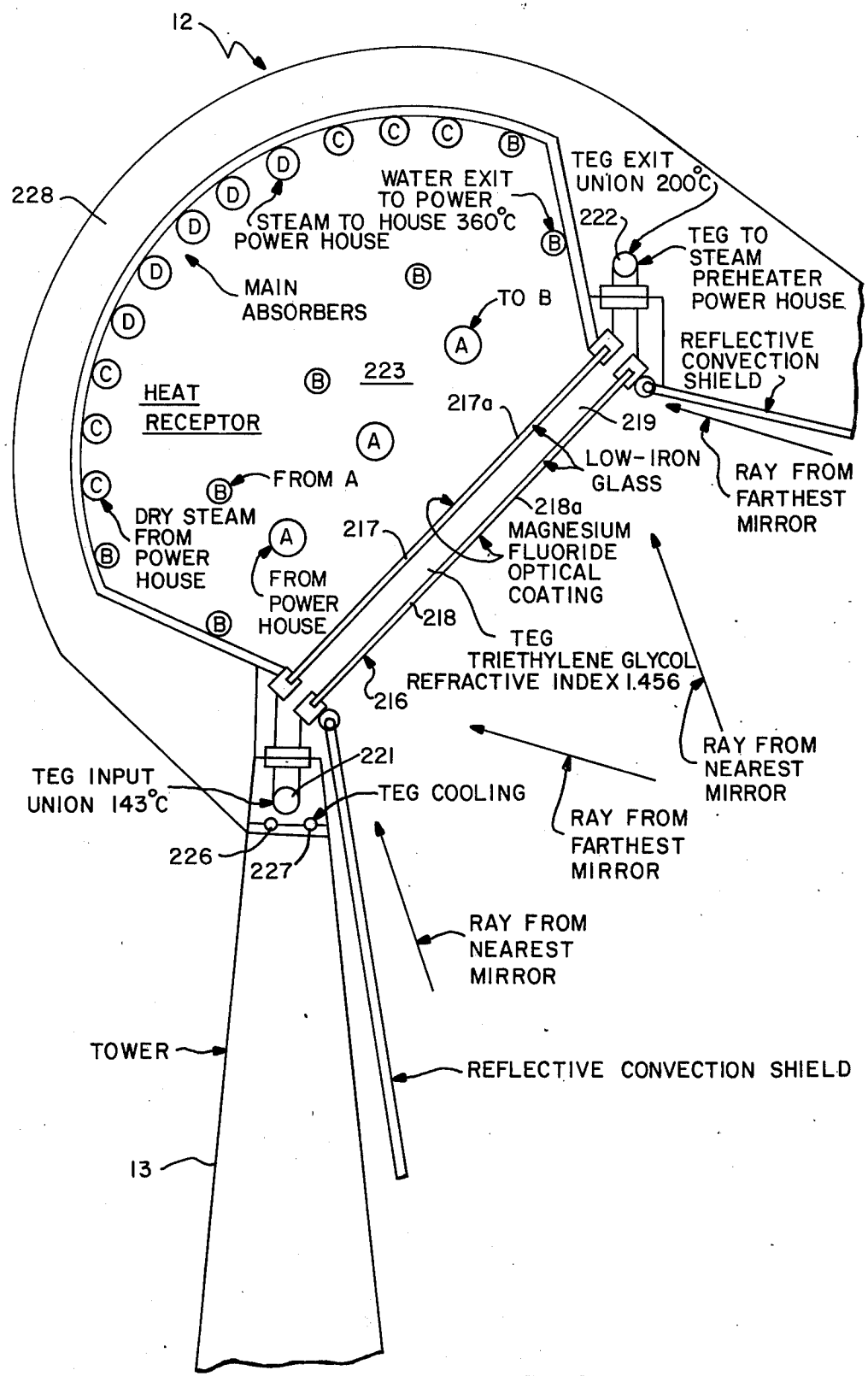
FIG.—9

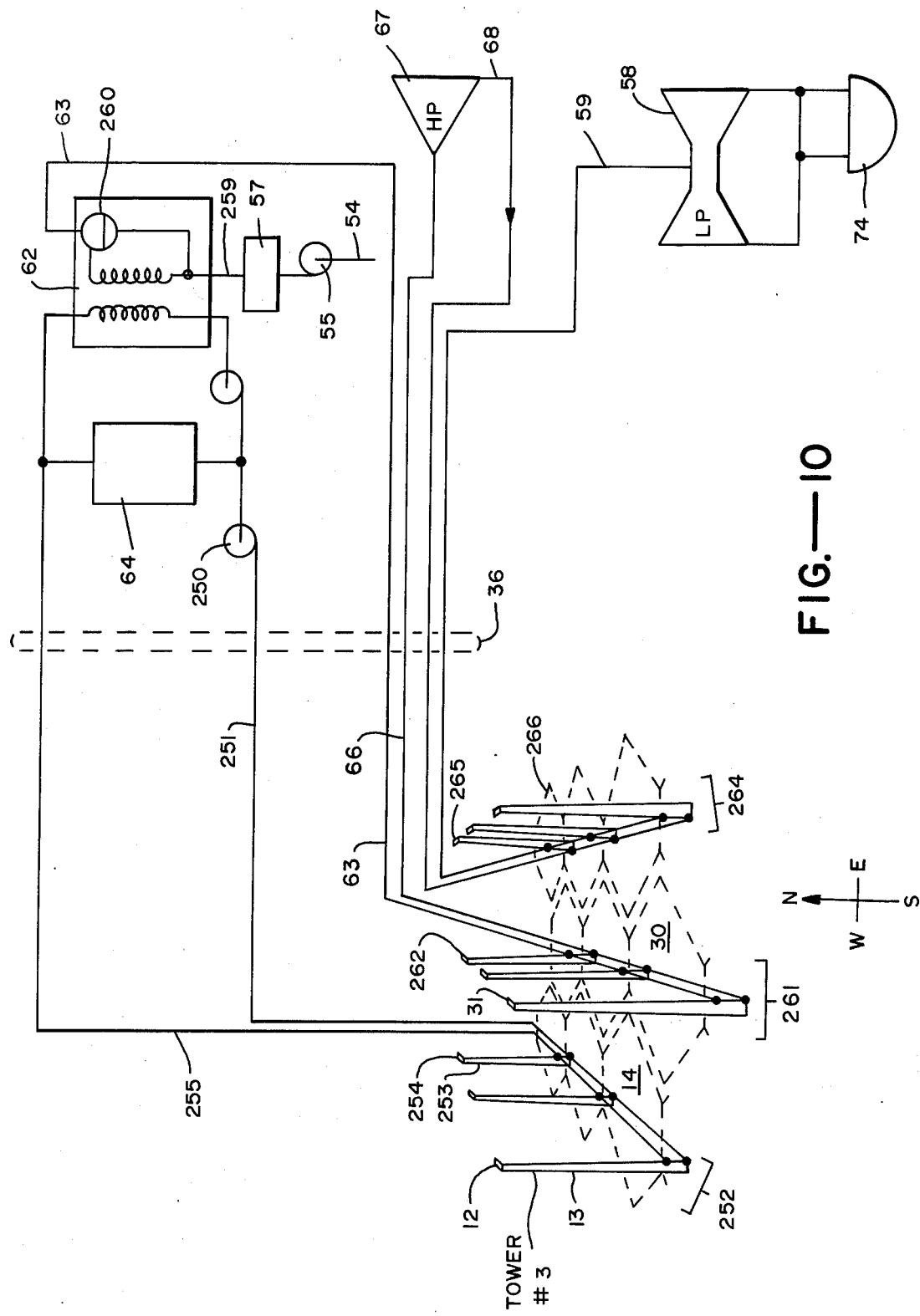
FIG.—10

SOLAR COLLECTOR SYSTEM

BACKGROUND OF THE INVENTION

The present invention is directed to a solar collector system and more specifically to solar field modules which concentrate sunlight onto a solar receptor by the use of heliostatic tiltable mirrors.

Heliostatic field modules of mirrors have been suggested in the past but have not been arranged in what is believed to be the most efficient configuration both from the overall field module pattern geometrical configuration and from the point of view of the individual heliostatic mirrors.

OBJECTS AND SUMMARY OF THE INVENTION

It is, therefore, a general object of the present invention to provide an improved solar collector system.

It is another object of the invention to provide a system as above which efficiently utilizes the solar collection capacity of the individual heliostatic mirror units.

It is another object of the invention to provide a relatively inexpensive and durable and easily repaired heliostatic mirror unit.

It is another object of the invention to provide a solar collector system as above which is effectively interfaced with the requirements of the associated thermal power plant.

In accordance with the above objects there is provided a solar collector system. A plurality of solar receptors are supported on towers. A predetermined plurality of the heliostatic mirrors are laid out in a geometric pattern to form a field module with a unique associated tower on which the field module concentrates solar energy. The field modules are substantially contiguous to one another and interlocked. The unique tower is located outside its associated field module.

BRIEF DESCRIPTION OF THE DRAWINGS

FIG. 1 is a simplified elevational view of solar collectors and a solar receptor embodying the present invention;

FIG. 2 is a perspective view of the array of interlocking hexagonal fields and their associated towers;

FIG. 3 is a plan view of a plurality of the solar collector field modules of FIG. 2;

FIG. 4 is a plan view of an alternative embodiment of FIG. 2;

FIG. 5 is a simplified sectional view of a single solar collector used in both FIGS. 2 and 3;

FIG. 6 is a schematic diagram of a power house used in the present invention;

FIG. 7 is a block diagram of a power plant illustrating extremum control;

FIG. 8 is an array of solar receptors similar to the plan view of FIG. 3; and

FIG. 9 is a detailed cross-sectional view of a solar receptor.

FIG. 10 is a simplified combination of FIGS. 2 and 6 illustrating an embodiment of the invention.

DETAILED DESCRIPTION OF THE PREFERRED EMBODIMENT

FIG. 1 is a simplified elevational view of solar collectors 10 which consist of a field of heliostatic (i.e., following the sun) tiltable mirrors 11 which focus and concentrate sunlight onto a solar heat receptor 12 mounted on a tower 13. The configuration and design of the solar heat receptor 12 is described and claimed in a copending application in the name of the present inventor entitled "Solar Thermal Electric Power Plant", filed Aug. 25, 1976, Ser. No. 771,641. In general, the mirrors face south and are automatically controlled to follow the movement of the sun to concentrate the maximum amount of solar energy during the day onto the solar heat receptor 12.

FIG. 2 is a perspective view of the array of interlocking hexagonal fields and their associated towers. Receptor 12 at the top of tower 13 receives solar energy reflected from the mirrors in hexagonal field 14. Similarly, the mirrors in field 30 illuminate receptor 31 at the top of tower 32. The base of tower 32 is within the field 33, not within the field 30. There is a significant distance 34 between the base of tower 32 and the boundary between field 33 (within which the tower is located) and field 30 (whose reflected light illuminates the heats receptor 31). The concentrated solar energy received by receptor 31 is carried in pipes 36 by hot heat-exchange fluids to the distant power house 35 which contains the steam turbine. The hexagonal field pattern in FIG. 2 minimizes the piping cost because it maximizes the utilization of the land. There is an appropriate or "best" receptor for any mirror at any field location.

FIG. 3 is a plan view of several solar towers 13 with their solar receptor 12 mounted thereon and associated heliostatic mirrors which are laid out in a hexagonal geometric pattern 15. The tower and the associated mirrors are termed a field module. All of the hexagonal fields 15 have their sides substantially contiguous to one another and are interlocked. The tower and receptor 12, 13 for an associated field is outside of the area of the field module. For example, tower #3 is outside the hexagonal field of "heliostats for tower #3" as indicated. A similar pattern is carried throughout. With this type of field module organization, no ground area space is wasted allowing the overall piping distances to be shorter. In addition, the angles of the mirrors with respect to each tower are optimized.

Specifically, the field of mirrors that concentrate solar light on one solar receptor lies to the north of the receptor. As illustrated in FIG. 1, the furthest mirror reflects light at a 20° elevation angle and the nearest mirror reflects light at a 60° elevation angle. The vertical angle of acceptance is only 40°. In the elevation direction, the maximum angular deviations from the normal to the receptor window of the reflected light from the nearest mirrors on the south boundary edge of the hexagon is 30°. However, a wider angle will increase the number of mirrors per module, and the radiation power per tower. Thus, an excessive angle will increase the cosine loss, the tracking loss, and the specular reflection loss at the window. Thus, depending on the specific equipment used, the optimum angle for minimum costs must be determined by taking all the foregoing factors into account.

The plan view in FIG. 3 shows field locations 37 and 38 at the extreme west and east vertices of the hexagon 30. The mirrors at these two locations reflect light along rays 39 and 40 respectively to receptor 31. In the plan view, the normal to the window of receptor 31 points straight north. Rays 39 and 40 each intersect the window at approximately 30° angle of incidence with respect to the normal. At this angle of incidence, the specular reflection from the glass is low. At larger angles of incidence, the specular reflection increases. Keeping other dimensions constant, as the distance from 37 to 38 increases, the specular reflection losses increase, although the number of mirrors and the reflected energy increase. There is an optimum dimension, such that increasing the distance from 37 to 38 begins to diminish the received energy per unit of investment.

In general it is believed that the non-regular hexagon is the ideal pattern for this application. For an interlocking type field as in the present invention the east-west distance between towers is greater than the diagonal or northwest-southeast direction. Moreover in design studies for minimum cost it is believed that the distance between adjacent towers in the northwest-southeast direction should be greater than the north-south direction. To accomplish this the hexagons are relatively wide in the east-west direction.

FIG. 4 is an alternative embodiment where the heliostatic mirror areas are octagons with a square protrudance. Again as in the case of FIG. 3 the tower B is apart from the heliostatic field area of tower B as indicated. Also shown are the maintenance roads through the various areas of the various field modules.

An individual heliostatic mirror is shown in FIG. 5 and includes a fiberglass epoxy base platen 16 with its substantially planar surface 17 having the wind guards 18a and 18b extending upwardly from its edges. A mirror-like surface is provided by a sheet or film of metallized polyester or Mylar (TM) 19 which is retained on the planar surface 17 by an electrostatic hold-down grid 21. As shown in FIG. 5 for simplicity of construction, surface 17 is flat. However, plastic film 19 will easily stretch to accommodate the shape of a paraboloid mirror platen which can easily be substituted. In addition to electrostatic hold-down, the film could also be held in place by vacuum. In either case the reflecting film 19 is easily replacable from a maintenance standpoint. The portion of the film which is reflecting light can be a part of a longer film which is available for future replacement.

FIG. 6 illustrates a typical power plant using the heat receptors of either FIGS. 3 or 4. The various solar receptors are indicated as $SR_W$, which refers to the triethylene glycol (TEG) liquid flowing through the double paned windows and solar receptors $SR_1$, $SR_2$ and $SR_3$ which are water or steam tubes of increasingly higher temperatures which are taken from the appropriate sections of the solar receptor. All of the foregoing is illustrated in detail in the copending application.

Referring now to the specific building blocks of the power plant a warm feedwater reservoir unit 51 which is at approximately 50° C. has its output pressure raised to 200 psi by feedwater pump 52 and passes through a first preheater 53. This preheater is a heat exchanger for the low pressure TEG for which $SR_W$ is the heat source. As indicated, the triethylene glycol exits preheater 53 at 140° C., is circulated through the window solar receptor and heated to 200° C. and returned to the preheater. It thus acts as a heat source for raising the feed water temperature to 180° C. at the exit 54. A storage unit 56 is in parallel with the incoming and outgoing TEG pipes.

A second feedwater preheater 57 is a condensing heat exchanger using reheated turbine exhaust as indicated at 388° C. and 226 psi after having passed through the heat storage unit 61. The turbine intermediate stage bleed from a low pressure turbine 58 is used at night and a bleed from an incoming line 59 through a heat storage unit 61 is used during the day. Such routing is done by valves with the indicated nomenclature for valve open in day only and valve open at night only. Heat storage unit 61 may use molten metal and provide for operation of the solar plant during peak energy hours in the evening.

A third heater 62 is actually the plant boiler which receives 360° C. water at 3,000 psi from the solar receptor field $SR_1$ and boils the water in the plant boiler to 335° C. at 2,000 psi as indicated at the exit 63. Thus, dry steam is produced.

The next stage is a super heater and includes the solar receptor $SR_2$ which has as its input steam from exit line 63 of the plant boiler 62 which flows into the solar heat receptor, is heated to a higher temperature, and exits on the line 66 at 1,700 psi and 500° C. and supplies high pressure turbine 67. The exhaust 68 from high pressure turbine 67 which is at 394° C. and 700 psi is reheated in a solar receptor $SR_3$ to 500 psi, 500° C. on line 59 and used as the input to the low pressure turbine 58. This reheat is provided by a suitable bank of solar receptors especially for that purpose.

For example, referring to FIG. 2 each of the field modules may operate at a separate optimum temperature or temperature range to produce fluids heated in those ranges. Since the relative flow rates in these solar receptors can be used to balance the heat available at the two or more temperatures to the heat usable in the steam system itself, this means that an optimum thermal efficiency can be achieved in this manner.

The low pressure turbine 58 exhausts into a spray condenser 74 at 1.84 psi absolute and 50° C. Some of the warm condensate is stored in a warm feed reservoir 51. However, most of the warm condensate is pumped through a heat rejection exchanger 76, a cool feed water reservoir 77 and then by means of a pump 78 back to the condenser 74 serving as the liquid spray for the condenser at the spray input 79. The heat rejection exchanger 76 rejects its heat into a cool pond or reservoir 81 which is kept cool by a dry cooling tower 82. The pond can be large enough to have a time constant of approximately one week and is to be protected or shaded from solar radiation so that it does not heat up during the day. The dry cooling tower has an effective time of operation at night and during high wind velocity conditions. Gravity separation can be used in the reservoirs so that the coolest bottom layer is used in the heat rejection exchanger and the high temperature water is fed into the top layer. The tower pumps from the top layer and feeds into the bottom layer, as illustrated. The dry cooling tower does not need a high power fan because it is not required to reject heat during the day time when air temperatures are high. It operates only when the air temperatures are low, or when the wind-augmentation is sufficient.

In general, all of the flows and parameters of the power plant of FIG. 6 in conjunction with the solar receptors of FIGS. 2 and 9 can be efficiently controlled by an extremum control system. That is, for example, all of the flows of either steam or water through the solar heat receptors can be shifted slightly, the total output or efficiency of the system measured and if this is a positive change, the change can be made permanent. This can be done until the peak of the extremum curve is reached. The same can be done with other inter-related operating portions of the system such as the actual electrical output versus steam input to the turbine.

FIG. 7 shows the turbine steam supply 66, turbine 67, the boiler 62 and water storage 64 for FIG. 6. Also shown is the field water pump 300, the boiler heat control pump 301, the return pipe 302 from the solar receptor pipes $SR_1$, a temperature sensor 303 which senses the water temperature in pipe 302, and temperature pressure and flow sensors 304, 305, and 306, respectively, for the state of the turbine inlet steam in supply 66. The process controller 307 receives the temperature signal from sensor 303, compares it with a reference, amplifies the error signal and delivers a command on 308 to control pump 300 to hold the sensed temperature constant. When the solar radiation diminishes, the pump flow rate diminishes to keep the fluid temperatures entering reservoir 64 relatively constant.

The sensors 304, 305 and 306 measure the temperature, pressure and flow rate of the steam entering the high pressure turbine and deliver these signals on channels 309, 310 and 311 respectively to computer 312 which calculates the thermodynamic performance of the turbine system and also calculates the mechanical output of the turbines and delivers this calculation on channel 313 to controller 314.

Controller 314 is of the extremum type which maximizes the computed signal on channel 313. The output control signal on channel 315 controls the pumping rate of the input fluid to boiler 62 by controlling the pump 301.

The controller 314 cross-correlates changes in pumping rate in 301 with the resulting computed mechanical output, and if this correlation is positive, it slowly increases the average pumping rate, until the computed output is a maximum with respect to the pumping rate of pump 301.

This control system partially decouples solar transients from the turbine conditions. In the absence of solar light, pump 300 essentially stops, and pump 301 extracts energy from reservoir 64 to keep the boiler 62 functioning.

An alternative source of information for computer 312 is the three-phase wattmeter 316 connected to the electrical output of generator 317 and measuring the electrical power delivered to the power system. This measured electrical power signal is delivered on channel 318 to controller 314. When this signal is used, the controller maximizes the generator output power with respect to flow rate in pump 301.

FIG. 8 shows an array of solar receptors 90 through 96 inclusive, located symmetrically inside the dotted line hexagon field boundaries similar to the plan view in FIG. 3. Each mirror is controlled in such a manner that it reflects to a receptor which lies to the south, and generally to the east in the morning, but at some time during the day it changes its control and reflects to a different receptor which lies generally to the west in the afternoon. The effect of these controls is to produce a moving hexagon field boundary. For tower and receptor 91 at noon, the hexagon boundary forms a hexagon field whose center is straight north of reflector 91 as shown by the solid hexagon 101. This is the same pattern as shown in FIG. 3. In the early morning, the hexagon is shifted to the west and slightly south, to the hexagon 100. Mirror locations A through M are shown in FIG. 8. In the early morning, mirrors E, F, G, H and K are illuminating receptor 91. Mirrors A, B, C, D and J illuminate receptor 90. Mirror L illuminates receptor 94 and mirror M illuminates receptor 95.

In the early morning, the hexagon boundary is 100, and during the morning, the hexagon boundary continuously moves east and slightly north, so that by noon, mirrors D, E, F, G, L and M, which lie inside boundary 101, illuminate receptor 91, Mirrors A, B and C illuminate receptor 90. Receptors J and K illuminate receptor 93. Mirror H illuminates receptor 92. In the afternoon, the hexagon moves east and slightly south, so that by late afternoon the boundary is hexagon 102. Now, mirrors B, C, D, E and J lie inside 102 and illuminate 91. Mirror A illuminates receptor 90. Mirrors F, G, H and K illuminate receptor 92. Mirror L illuminates receptor 95 and M illuminates receptor 96. Mirrors in the special region S illuminate the receptor 94 in the morning (like L) and receptor 96 in the afternoon (like M), but never attempt to illuminate 91 at noon (because of the blocking action of 95).

The purpose of this change in mirror aiming is to maximize the area of the mirror presented to the incoming solar light, by making the mirror surface more nearly perpendicular to the solar rays, and minimizing the cosine loss.

The following table shows the reference number of a tower receptor in FIG. 8 which is illuminated by the mirror location indicated by the lettered row at the time of the column heading.

| Mirror Location | Time | | | | |
| --- | --- | --- | --- | --- | --- |
| | 9:00AM | 11:00AM | 12 NOON | 1:00PM | 3:00PM |
| A | 90 | 90 | 90 | 90 | 90 |
| B | 90 | 90 | 90 | 90 | 91 |
| C | 90 | 90 | 90 | 91 | 91 |
| D | 90 | 91 | 91 | 91 | 91 |
| E | 91 | 91 | 91 | 91 | 91 |
| F | 91 | 91 | 91 | 91 | 92 |
| G | 91 | 91 | 91 | 92 | 92 |
| H | 91 | 91 | 92 | 92 | 92 |
| J | 90 | 93 | 93 | 93 | 91 |
| K | 91 | 93 | 93 | 93 | 92 |
| L | 94 | 91 | 91 | 91 | 95 |
| M | 95 | 91 | 91 | 91 | 96 |
| S | 94 | 94 | 94 | 96 | 96 |

The hexagonal field shape is superior to a rectangular field shape because the corners of the rectangle nearest the receptor are very inefficient in delivering energy, because the corner mirror normals have a large angle with respect to the ray to the receptor, and the angle of incidence at the window is large. Similarly, the most distant corner mirrors of the rectangle could be more efficiently used if they illuminate a tower which is not straight south of the center of the rectangle. Cutting off these rectangle corners and staggering the towers will yield the octagon plan design similar to FIG. 4, which is superior to rectangular fields, because the patterns are interlocked, no land area is wasted, and the azimuth angles at the receptors are restricted to a narrow range.

The octagons in FIG. 4 can be converted to the hexagons in FIG. 3 with an increase in reflected power efficiency by the following transformation. Draw the line 105 between the external vertices 106 and 107 of field E. Draw the line 108 between external vertices 109 and 110 of field E. Shifting the boundaries 111, 112, 113 and 114 of the octagon to lines 105 and 108 will increase the area of field E. In a similar manner, shifting the boundaries 115, 116, 117 and 118 of the octagon to lines 119 and 120 drawn between external vertices 107 and 121 and 110 and 122, respectively will diminish the area of field E. The resulting hexagonal field defined by 105, 108, 119 and 120 has the same area as the original field E, but has a more desirable optical performance.

One form of receptor 12, as also disclosed in the above copending Smith application, is shown in cross-section in FIG. 9 and includes a double paned window 216 having separate glass panes 217 and 218 with a flow space 219 between the panes. The windows are typically of low iron glass and are coated on the outside, that is at the air glass interfaces 217a, 218a, with a magnesium fluoride optical coating to minimize reflection. The interpane space is filled with triethylene glycol (TEG) which enters the space at 221 and exits at 222. These inputs and exits are connected to the power plant to provide preheat for the power plant's boiler feedwater.

The preferred liquid to be used in the interpane space 219 is colorless so that it does not absorb energy from the sun and should have an index of refraction close to that of the panes 217 and 218. Thus, with a low iron glass window which has an index of refraction of approximately 1.50 one of the group of the following may be used (in addition to the TEG which has a refractive index of 1.456); butyrophenone, o-toluidine, chlorobenzene, diethylene glycol, triethylene glycol, tetraethylene glycol and trimethylene dibromide. In addition, a suitable mixture of two liquids can provide an equivalent refractive index.

Thus, in summary the double paned window structure performs a triple function: the interpane fluid provides valuable heat to the steam preheaters in the power house; the fluid cools the windows for extended life; and because of the relatively low temperature of the glass, the infrared and convection losses to the environment are greatly reduced. Moreover, because of the nearly equal refractive indices of the glass and fluid the reflection from the inside surfaces of the glass is negligible. Thus, the window transmits more than 95% of the solar energy to the heat receptors in the cavity 223.

Because of the importance of keeping the glass of the window cool the fluid pumping rate is controlled to hold the outlet temperature at 200° C.

The interpane fluid may also serve yet another purpose of cooling tower supports 213. The pipes 226 and 227 are in close thermal connection with the support tower (for example, welded to it) and are in series with the input union 221.

Cavity 223 is formed by the thermal insulation 228 which provide a semi-circular enclosure which terminates at the window 216. Within the cavity 223 are a number of water or steam carrying tubes which are coated with black heat absorbing material. The panel of tubes at the back of the cavity area 223 marked C and D are the main absorber of solar energy. The tubes in front designated A and B form a lower temperature screen and they intercept only about half of the incoming light. The visible light reflection from the front tubes is a major loss component and is kept low by the geometry of the cavity 223 and by a high absorption coating. Visible light reflected from the back panel is mostly absorbed by other tubes, but is also kept low by a high absorption coating. Specifically, tubes A and B are coated with a low infrared emissivity intermetallic aluminum-nickel and C and D with a high visible absorption coating of intermetallic aluminum-chromium. The tubes are typically constructed of stainless steel. The infrared radiation from the back of the panel in the C and D tubes' location is mostly absorbed by the walls, by other back tubes and by the front tubes. The infrared radiated by the front tubes A and B is absorbed by the window 217. However, this radiation is kept low by the relatively low tube temperature. For example, the incoming fluid such as water might enter at 320° C. from the power house, circulates through the A tubes and then through the B tubes, indicated and exits at 360° C. The low emissivity coating for infrared on the front tubes minimizes heat transfer from the front tubes to the window.

High pressure water flows out from the power house in the A tubes at a minimum temperature and at 200 atmospheres pressure. Such high pressure prevents the water from boiling. In the solar receptor module the water is passed from the A to the B tubes reaching a maximum temperature of 360°. and returned from the B tubes to the power house. Fifty-five percent of the heat required by the thermodynamic system is provided by this water. The heat exchange fluids flowing outside of the receptors are in certain headers which are heavily insulated. Thus, the conductive heat loss is negligible, and the piping costs in addition to the receptors is low.

Dry steam flows out from the power house in the C tubes and returns through the D tubes. These are the tubes in the rear portion of the cavity 223 as opposed to the intermediate location of the A and B tubes. The radiation heat exchangers in the receptor cavity 223 are a net flow from the D tubes to the A and B tubes and the window. Thirty-one percent of the heat required by the thermodynamic system is provided by the returning dry steam in the D tubes which exits at 500° C.

As referred to earlier in the specification in conjunction with FIG. 2 each of the field modules may operate at a separate optimum temperature to produce fluids heated in those ranges. FIG. 10 illustrates this concept which in essence is a combination of FIGS. 2 and 6. Specifically, there is shown the receptor 12, tower 13, fields 14, 30, tower 32, and receptor 31. The heat exchanger 62, turbine 67 and turbine 58 are all also shown in FIG. 6. The piping for the heat exchange fluids from and to the power house 36 is shown as the assembly of pipes 59, 63, 66 and 68 which are also shown in FIG. 6. Two additional pipes are labeled 251 and 255 in both FIG. 10 and FIG. 6.

Referring specifically to the details of FIG. 10, a first heat exchange fluid is pumped by fluid pump 250 through pipe 251 to the row of towers 252 containing towers 13 and 253. In this row, tower 13 has a receptor 12 and tower 253 has a receptor 254 through which the fluid in pipe 251 flows and is heated. The receptors in row 252 contain the pipes marked SR-1 in FIG. 6. The fluid exits from receptors 254 in pipe 255 which carries it back to the storage reservoir 64 and to the heat exchanger 62. The fluid in 64 is slightly above the temperature of the boiling water. The pressure in 64 obviously can be much different than the pressure in 62.

High-pressure high-temperature boiler feedwater is supplied by pipes 54 and 259 to the boiler portion of heat exchanger 62, and saturated steam is delivered by the separation drum 260 to steam line 63. This steam goes to the tower row 261, via pipe 63, containing receptors 31 and 262. Inside of receptors 31 and 262 are the pipes marked SR-2 in FIG. 6. Here the steam is superheated, and dry steam flows back in pipe 66 to the power house and to turbine 67. This fluid is at a much higher temperature than the fluids in 62.

The exhaust from turbine 67 in pipe 68 flows to the field tower row 264, containing receptor 265. In the receptors of row 264 are pipes marked SR-3 in FIG. 6.

In these, the steam is reheated to a high temperature, medium pressure, and the reheated steam flows in pipe 59 to the low-pressure turbine 58. The temperature in pipe 59 is of the same order of magnitude as the temperature in 66, but the pressure in 59 is much lower than in 66.

The low pressure steam being reheated in receptor 265 has a large volume, so that row 264 is chosen close to the power house. The fluid in 64, 251, 254 and 255 has a small volume, and therefore row 252 can be distant from the power house.

What is claimed is:

1. A solar collector system comprising: a plurality of solar receptors supported on towers; a plurality of heliostatic mirrors, a predetermined plurality of such mirrors laid out in a geometric pattern forming a field module with a unique associated tower on which such field module concentrates solar energy, each of said field modules being substantially contiguous to one another and interlocked, said unique tower being located outside of its associated field module.

2. A system as in claim 1 in which said geometric pattern is a hexagon.

3. A system as in claim 2 where said hexagon is non-regular.

4. A system as in claim 1 where each mirror comprises: a substantially cylindrical surface; and a relatively thin flexible reflecting sheet laid on said surface; and means for retaining said sheet on said surface.

5. A system as in claim 4 where said retaining means includes an electrostatic hold-down grid.

6. A system as in claim 1 where each mirror comprises: a substantially planar surface; and a relatively thin reflecting sheet laid on said surface; and means for retaining said sheet on said surface.

7. A system as in claim 6 where said retaining means includes an electrostatic hold-down grid.

8. A system as in claim 6 where said retaining means includes wind guard means extending upwardly from the edge of said planar surface.

9. A system as in claim 1 together with a thermal power plant having fluids at at least two different temperature ranges and where one of said field modules provides heating for a fluid of one temperature range and another field module for the other temperature range.

10. A system as in claim 1 where each mirror comprises: a substantially paraboloid surface; and a relatively thin flexible reflecting sheet laid on said surface; and means for retaining said sheet on said surface.

11. A system as in claim 10 where said retaining means includes an electrostatic hold-down grid.

12. A system as in claim 10 where said reflecting sheet is a portion of a longer sheet available for future replacement.

13. A system as in claim 1 including power plant means having a turbine and heat exchanger means connected to said plurality of solar receptors said heat exchanger means receiving a pressurized first liquid from said solar receptors and providing a working fluid for said turbine, means for pumping said pressurized first liquid through said heat exchanger; means for superheating said working fluid; heat energy sensor means for the said superheated working fluid at the throttle of said turbine, and control means for controlling said pumping means to maximize said heat energy sensed by said sensor means.

14. A system as in claim 13 together with first liquid storage means intermediate said heat exchanger means and said solar receptor including second pumping means, means for sensing said liquid temperature, and control means responsive to said temperature for adjusting said second pumping means to maintain said temperature constant.

15. A system as in claim 13 where said turbine drives an electrical generator together with means for sensing the output of said generator, said control means being responsive to said output to maximize such output by controlling said pumping means.

16. A system as in claim 13 where said first liquid is water and said working fluid is water.

17. A system as in claim 1 including power plant means having a turbine, generator, and heat exchanger means connected to said plurality of solar receptors said heat exchanger means receiving a first liquid from said solar receptors and providing a working fluid for said turbine, means for pumping said first liquid through said heat exchanger, means for sensing the electrical output of said generator, and control means for controlling said pumping means to maximize said electrical output sensed by said sensing means.

18. A system as in claim 17 where said first liquid flows between two glass panes of a double-paned window on one of said receptors.

19. A system as in claim 17 where said first liquid flows in metal pipes in the interior of one of said receptors.

20. A system as in claim 19 where said first liquid is water.

21. A system as in claim 19 where said metal pipes are coated with a black solar-energy-absorbing coating.

22. A system as in claim 1 in which said towers form first rows in approximately a north-south direction, and said towers form second rows in approximately an east-west direction, and said towers form third rows in approximately a northwest-southeast direction, the distance between adjacent towers in one of said second rows being greater than the distance between adjacent towers in one of said third rows.

23. A system as in claim 22 where the distance between adjacent towers in one of said third rows is greater than the distance between adjacent towers in one of said first rows.

24. A system as in claim 1 together with a thermal power plant having fluids at at least two different pressures, and where one of said field modules provides heating for a first liquid at a first pressure, and another field module provides heating for a second fluid at a second pressure.

25. A system as in claim 24 where said first and second fluids are different phases of a single fluid where said first phase is superheated steam which flows to a high-pressure turbine in said thermal power plant, and where said second phase is the low-pressure steam from said turbine being reheated.

26. A system as in claim 1 wherein each of said receptors comprises a cavity with an optical opening, and means for reflecting said solar energy through said opening by reflective shields adjacent to and outside of the boundaries of said opening.

27. A system as in claim 26 wherein said optical opening is a double-paned window.

28. A system as in claim 27 including means for circulating a coolant fluid in the interpand space of said double-paned window.

29. A system as in claim 28 wherein said fluid as an optical refractive index substantially similar to that of the panes of said double-paned window.

30. A system as in claim 1 wherein each of said receptors comprises a cavity with an optical opening, and means for reducing convective air flows near said opening by convection shields adjacent to and outside of the boundaries of said opening.

31. A system as in claim 30 wherein said optical opening is a double-paned window.

32. A system as in claim 31 including means for circulating a coolant fluid in the interpane space of said double-paned window, said fluid having an optical refractive index substantially similar to that of the panes of said double-paned window.

33. A solar collector system comprising: a plurality of solar receptors supported on towers; a plurality of heliostatic mirrors, a control system for one of said mirrors which is associated with a first and a second of said receptors for selected predetermined times of day, means for reflecting solar light from said mirror toward said first receptor before said predetermined time, and means for reflecting solar light from said mirror toward said second receptor after said predetermined time.

34. A system as in claim 33 where all of the heliostatic mirrors which are reflecting solar light toward said first reflector at any one time form a first field module with a geometrical pattern which is hexagonal, and all of the heliostatic mirrors which are reflecting solar light toward said second reflector at said time form a second geometrical field module pattern which is hexagonal.

35. A system as in claim 34 where said first and said second field modules are contiguous.

36. A system as in claim 1 where each mirror comprises: a substantially paraboloid surface; and a relatively thin reflecting sheet laid on said surface; and means for retaining said sheet on said surface.

37. A system as in claim 1 where said geometric pattern forming a field module is a function of the time of day, and means for changing said geometric pattern with respect to said unique associated tower.

38. A system as in claim 37 where said field module lies to the north and west of said unique tower in the morning, and said field module lies to the north of said unique tower at noon, and said field module lies to the north and east of said unique tower in the afternoon.

39. A system as in claim 33 where substantially all of the heliostatic mirrors which are reflecting solar light toward said first reflector at a predetermined time form a first field module with a geometrical pattern which is substantially hexagonal, and substantially all of the heliostatic mirrors which are reflecting solar light toward said second reflector at said predetermined time form a second geometrical field module pattern which is substantially hexagonal.

40. A system as in claim 39 where said first and second field modules are contiguous.

41. A system as in claim 33 where said mirrors have a substantially planar surface, with a relatively thin reflecting sheet laid on said surface, and means for retaining said sheet on said surface.

42. A system as in claim 33 wherein said mirrors have a substantially paraboloid surface, with a relatively thin flexible reflecting sheet laid over said surface, and means for retaining said sheet on said surface.

43. A system as in claim 33 wherein one of said receptors has window means consisting of two visibly transparent panes and means for circulating a transparent fluid between said panes.

44. A system as in claim 43 wherein said solar light from said mirror toward said first receptor is transmitted through said window.

45. A system as in claim 44 wherein said fluid has an optical refractive index substantially similar to that of said visibly transparent panes.

46. A solar collector system comprising: a plurality of heliostatic mirrors, a first windowed solar receptor on a tower, a second windowed solar receptor on a second tower, a predetermined plurality of said mirrors concentrating solar energy on said first solar receptor, another predetermined plurality of said mirrors concentrating solar energy on said second solar receptor, first heat absorbing pipes within said first receptor, second heat absorbing pipes within said second receptor, a thermodynamic system containing a turbine, and means for circulating a first fluid through said first pipes to provide heat energy for said turbine, and means for circulating a second fluid through said second pipes to provide additional heat energy to said thermodynamic system.

47. A system as in claim 46 where said first fluid is dry steam for the inlet of said turbine and where said second fluid is liquid water.

48. A system as in claim 46 together with a heat-exchanger-boiler, and a circulating pump, where said second fluid is pumped by said pump through said second pipes and back at high temperature through said heat-exchanger-boiler, means for providing feed water to said boiler, and means for providing the steam produced by said boiler as said first fluid into said first pipes.

49. A system as in claim 46 together with a first and a second heat exchanger, a first and a second circulating pump, and a feed water supply, where said first fluid is pumped by said first pump through said first pipes and said first heat exchanger to increase the thermal energy of a flow of feed water from said feed water supply through said first heat exchanger to an outlet port, and where said second fluid is said feedwater which is pumped by said second pump through said second pipes and said second heat exchanger to increase the thermal energy of the flow from said output port through said second heat exchanger.

50. A solar collector system comprising: a plurality of heliostatic mirrors, a first windowed solar receptor on a first tower, a second windowed solar receptor on a second tower, a predetermined plurality of said mirrors concentrating solar energy on said first solar receptor, another predetermined plurality of said mirrors concentrating solar energy on said second solar receptor, first heat absorbing pipes within said first receptor, second heat absorbing pipes within said second receptor, a thermodynamic system containing a turbine, and means for circulating through said first pipes a first phase of a working fluid for said turbine, and means for circulating through said second pipes a second phase of said working fluid.

51. A system as in claim 50 where said first phase is saturated steam from a boiler in said thermodynamic system, and wherein said second phase is low pressure dry steam from the exhaust of said turbine being reheated.

52. A system as in claim 50 wherein said first phase is boiler feed water and wherein said second phase is steam.

* * * * *